United States Patent [19]

Pemsler et al.

[11] 3,950,487

[45] Apr. 13, 1976

[54] SOLVENT-IN-PULP EXTRACTION OF COPPER AND NICKEL FROM AMMONIACAL LEACH SLURRIES

[75] Inventors: J. Paul Pemsler, Lexington; John K. Litchfield, Bedford, both of Mass.

[73] Assignee: Kennecott Copper Corporation, New York, N.Y.

[22] Filed: June 13, 1974

[21] Appl. No.: 479,150

[52] U.S. Cl. .................. 423/24; 473/32; 473/139; 473/150; 75/101 BE
[51] Int. Cl.². C01G 3/00; C01G 51/00; C22B 3/00
[58] Field of Search .............. 423/24, 139, 32, 150; 75/101 BE, 103, 117, 119; 23/267 MS

[56] References Cited
UNITED STATES PATENTS

| | | | |
|---|---|---|---|
| 3,206,288 | 9/1965 | Hazen et al. ................... | 23/267 MS |
| 3,224,873 | 12/1965 | Swanson ................................ | 423/24 |
| 3,743,585 | 7/1973 | Lowenhaupt et al. ................ | 75/119 |
| 3,761,249 | 9/1973 | Ritcey et al..................... | 75/101 BE |

OTHER PUBLICATIONS

Ritcey, "Solvent–in–Pulp processing using sieve plate pulse columns" *Chemistry and Industry* 6 Nov. 1971 pp. 1294–1299.

Proceedings of the Second United Nations International Conference on the Peaceful Uses of Atomic Energy; United Nations, Geneva 1958, Vol. 3 pp. 499–501.

*Primary Examiner*—Oscar R. Vertiz
*Assistant Examiner*—Brian E. Hearn
*Attorney, Agent, or Firm*—John L. Sniado; Lowell H. McCarter; Anthony M. Lorusso

[57] ABSTRACT

A process in which copper, nickel, cobalt and molybdenum are recovered by leaching comminuted raw manganese nodules with an aqueous ammoniacal leach solution containing cuprous ions. An improvement is disclosed in which the metal values are extracted directly from the leach slurry with an organic extractant. To accomplish such extraction the amount by weight of solids in the slurry is maintained at less than 20 percent, the pH of the slurry is lowered to 9.5, the volumes of slurry and organic are maintained at a ratio so that the organic is the continuous phase and the organic and slurry are mixed with gentle agitation.

16 Claims, 5 Drawing Figures

SOLVENT-IN-PULP EXTRACTION OF COPPER AND NICKEL FROM AMMONIACAL LEACH SLURRIES

BACKGROUND OF THE INVENTION

In patent application Ser. No. 311,063 entitled "Recovery of Metal Values from Manganese Deep Sea Nodules", filed on Dec. 1, 1972, by Lester J. Szabo, the teachings of which are incorporated herein by reference, a process is disclosed in which copper, nickel, cobalt and molybdenum are recovered from raw manganese nodules with an aqueous ammoniacal leach solution containing cuprous ions. The process disclosed in application Ser. No. 311,063 is a significant breakthrough in the metallurgical art in that it significantly expands the world's source of copper, nickel, cobalt and molybdenum. The process disclosed in application Ser. No. 311,063 has come to be called the "cuprion" process. The cuprion process includes the step of contacting ground manganese nodules with an ammoniacal leach solution containing cuprous ions in a reaction vessel to reduce the manganese oxides in the nodules to enable metal values such as copper, nickel, cobalt and molybdenum to be solubilized. The leaching produces a leach slurry which contains reduced solid nodules with entrained metal values as well as dissolved metal values. The solid nodule residue is separated from the liquid and the liquid is recycled. The nodule residue is washed with an ammoniacal ammonium carbonate solution to remove entrained metal values from the residue. Thereafter, the metal values are extracted from the wash liquor.

The leach slurry is solid $MnCO_3$ with some $Fe(OH)_3$ and clays, and liquor consisting of an $NH_4OH$ — $(NH_4)_2CO_3$ solution containing solubilized copper and nickel with lesser amounts of cobalt and molybdenum values. The cuprion process normally uses a countercurrent wash circuit consisting of seven thickeners, to wash the solids of entrained metals. Of course, large capital expenditures are required for the wash apparatus and the apparatus is relatively costly to operate.

In the wash circuit of the cuprion process, slurry containing about 45 percent by weight solids is contacted with with $NH_4OH$ — $(NH_4)_2CO_3$ solutions through various wash stages at a wash ratio of about 2 to 1. Pregnant wash liquor is contacted with an organic extractant to recover copper and nickel values. The raffinate is steam stripped and treated to remove cobalt and molybdenum.

Direct extraction of metal values with the organic from the nodule slurry would eliminate the washing circuit with a large attendant capital savings. It would have the further advantage of greatly decreasing plant space requirements, therby making it possible to perform shipboard processing of nodules.

This invention relates to the separation and recovery of desired non-ferrous metal values from a slurry of solids and solution which contains such metal values. In a broader sense, however, this invention is an improvement in extraction leaching and can be used to great advantage in any leaching process. The direct extraction of leached metal values from slurry is a desirable step in many commercial operations. Extensive prior art studies have been performed on resin-in-pulp extraction using ion exchange beads and screens to separate them from slurry particles. A major problem in the process is the attrition of the resin beads and the attendant expense of their replacement. The process has been used commercially only for expensive metals like uranium.

Solvent-in-pulp processes have been explored using different types of contactors. Entrainment losses of organic are invariably high and increase with the degree of agitation, and there is a great tendency to emulsion formation. Organic losses are also dependent on the adsorption of the liquid ion exchange reagent on the particles in the pulp. Commercialization of this technique has not been realized.

In short, for the past ten years, work has been in progress to improve the economics of recovery from leached ores by direct solvent extraction of metal values from a slurry. However, a method for directly leaching base metal values from slurries which could be used on a commercial scale has not materialized.

SUMMARY OF THE INVENTION

In accordance with the present invention, it has been discovered that by maintaining an organic-continuous phase in the mixer and by controlling agitation to avoid the formation of an emulsion, metal values can be substantially extracted from slurries with low organic reagent losses.

Accordingly, it is an object of the present invention to provide an improved process for recovering metal values from manganese nodules in which liquid-solid separation before liquid ion exchange extraction is eliminated.

A further object of the present invention is to provide a process for the recovery of metal values from manganese nodules by the cuprion process in which the step of washing the solids to remove additional metal values is eliminated.

A further object of the present invention is to provide an economical method for extracting base metal values directly from leached slurries.

Yet another object of the invention is to provide an improved method of slurry leaching.

DESCRIPTION OF THE PREFERRED EMBODIMENTS

Figure 1:
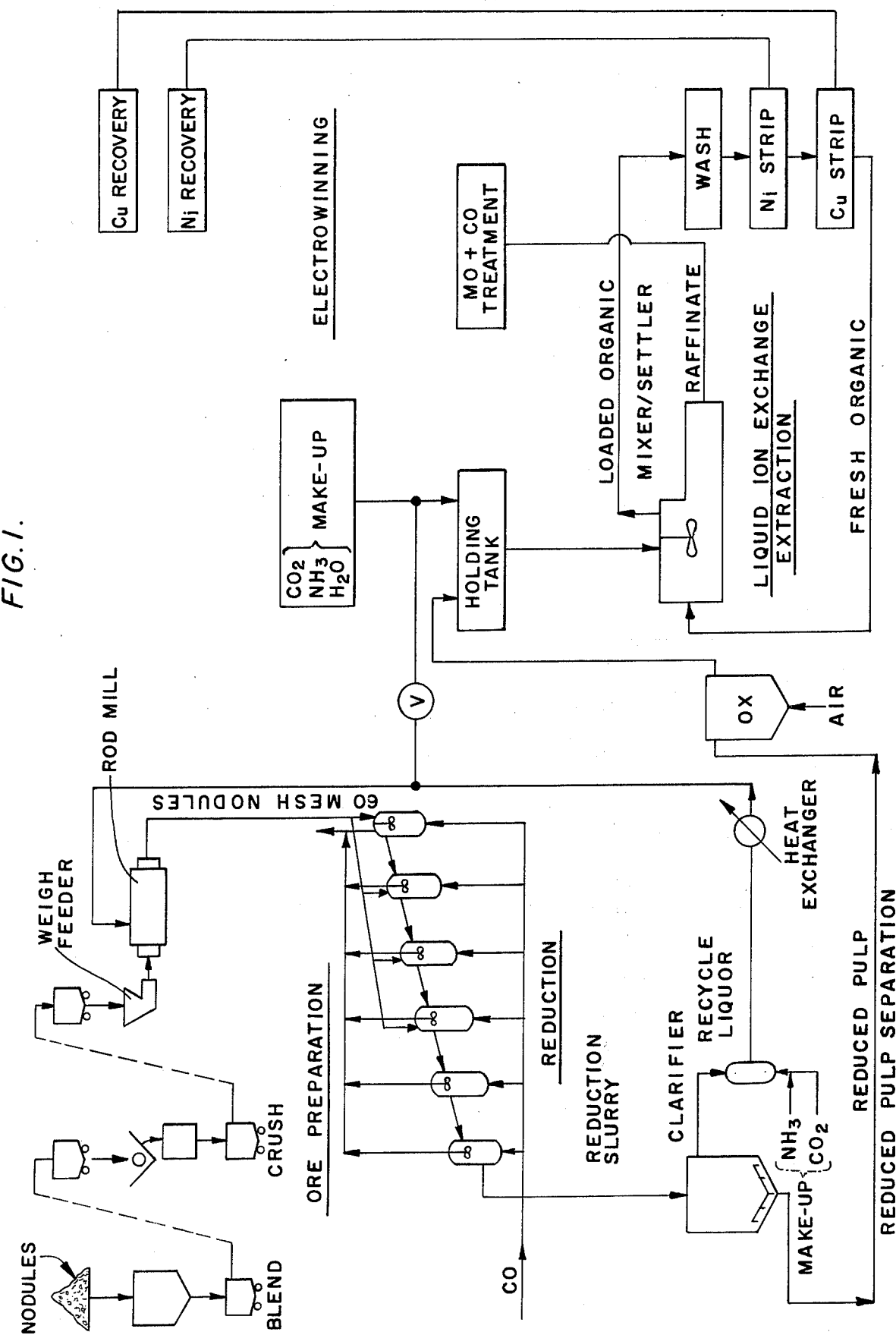
FIG. 1 is a flow sheet showing the process of the present invention.

One important embodiment of the present invention is directed to extracting metal values directly from leached slurries and has particular application in the recovery of metal values from manganese deep sea nodules. Since the process of the present invention has particular application in recovering metal values from manganese nodules by the cuprion process, an overall description of that process as well as a description of manganese nodules follows.

For the purpose of this patent specification and claims, complex ores which are found on the deep sea floor of oceans and lakes containing manganese, iron, copper, nickel, molybdenum, cobalt and other metal values are variously referred to as deep sea manganese nodules, manganese nodules or nodules.

Ocean floor deposits are found as nodules, loose-lying at the surface of the soft sea floor sediment, as grains in the sea floor sediments, as crusts on ocean floor hard rock outcrops, as replacement fillings in carcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The character and chemical content of the deep sea nodules may vary widely depending upon the region from which the nodules are obtained. The Mineral Resources of the Sea, John L. Mero, Elsevier Oceanography Series, Elsevier Publishing Company, 1965, discusses on pages 127–241 various aspects of manganese nodules. For a detailed chemical analysis of nodules from the Pacific Ocean see pages 449 and 450 in The Encyclopedia of Oceanography, edited by R. W. Fairbridge, Reinhold Publishing Corp., N.Y. 1966, and U.S. Pat. No. 3,169,856. For the purpose of this invention the complex ores will be considered as containing the following approximate metal content range on a dry basis:

METAL CONTENT ANALYSIS RANGE

| | |
|---|---|
| Copper | 0.8 – 1.8% |
| Nickel | 1.0 – 2.0% |
| Cobalt | 0.1 – 0.5% |
| Molybdenum | 0.03 – 0.1% |
| Manganese | 10.0 – 40.0% |
| Iron | 4.0 – 25.0% |

The remainder of the ore consists of oxygen as oxides, clay minerals with lesser amounts of quartz, apatite, biotite, sodium and potassium feldspars and water of hydration. Of the many ingredients making up the manganese nodules, copper and nickel are emphasized because, from an economic standpoint, they are the most significant metals in most of the ocean floor ores.

In the cuprion process, raw manganese deep sea nodules are reduced with cuprous ions (Cu+) in an aqueous ammoniacal ammonium carbonate solution. The cuprous ions reduce the manganese in the nodules which enables metal values such as copper, nickel, cobalt and molybdenum to be dissolved while leaving undesirable metals such as iron in the solid residue. In the reduction process, the manganese dioxide in the deep sea nodules is reduced by cuprous ion to manganese carbonate according to the reaction:

$$MnO_2 + 2\ Cu(NH_3)_2^+ + 4\ NH_3 + CO_2 + H_2O \rightarrow MnCO_3 + 2\ Cu(NH_3)_4^{2+} + 2\ OH^- \qquad (1)$$

Cupric ions indicated in equation (1) are reduced back to the cuprous state with carbon monoxide according to the reaction $$2\ Cu(NH_3)_4^{2+} + CO + 2\ OH^- \rightarrow 2\ Cu(NH_3)_2^+ + 4\ NH_3 + CO_2 + H_2O \qquad (2)$$

Cuprous ion is consumed in reaction (1) and is regenerated by reaction (2). The net overall reaction for the reduction process is the sum of equation (1) and (2), or equation (3):

$$MnO_2 + CO \rightarrow MnCO_3 \qquad (3)$$

The process of the present invention is illustrated by the following example. At the outset, however, it is emphasized that the following description relates to a procedure that is performed in a pilot plant. By extrapolating the results given for the pilot plant, however, one skilled in this art can design a commercial plant or an ocean going vessel for processing large quantities of nodules.

The pilot plant is designed for ½ tons per day nodule throughput, based on a 3½ percent solid slurry and with up to a three hour hold-up in the reduction section.

The process performed in the pilot plant in accordance with the present invention can be broken down in the following sections.
1. Ore Preparation
2. Reduction-Leach
3. Liquid Ion Exchange Extraction of the Metals
4. Metal Recovery

ORE PREPARATION

The nodules utilized in the pilot plant process are received in 55 gallon drums in the condition that they are in after being mined from the deep sea ocean bottom. To facilitate processing in the pilot plant, the nodules are air dried. After they are dried, they are then blended, using the "cone and quarter" technique before going into the primary crushing circuit. The primary crushing circuit consists of a crusher such as a Jacobson "Full Nelson" to reduce the raw nodules to minus one inch. Thereafter, the nodules are passed through a Stedman double row cage mill to reduce the ore further to minus 6 mesh. The nodules are then conveyed away on a belt feeder to drums for storage or further processing.

The second grinding circuit is the final stage of ore preparation before the nodules enter the reduction stage. This circuit consists of a hopper, filled from the drums of cage milled ore, located on top of a hydraulic weigh feeder. The weigh feeder is used to meter nodules at a given rate into an open circuit rod mill for final grinding. The rod mill reduces the nodules from a particle size of minus six mesh to a particle size of approximately minus sixty mesh. As the nodules enter the rod mill, they are wetted with a synthetic sea water which brings the nodules up to approximately 40% moisture. This moisture content corresponds to the moisture which would be present in nodules as they are brought up from the sea bottom. At this point, it should be noted that in a commercial operation the nodules would be processed directly after being mined from the ocean bottom; thus, the foregoing steps of drying and wetting the nodules would be unnecessary. However, for purposes of a pilot plant operation it was found convenient to air dry the nodules and later wet the nodules so that they had a moisture content equivalent to that of freshly mined nodules.

It has been found advantageous to add recycle reduction liquor to the rod mill. In a commercial process recycle liquor can be added to the grinding mill in order to provide the liquor to facilitate grinding and reduce the dust problem without introducing more water into the circuit which would cause undesirable dilution. Of course, the recycle reduction liquor is advantageous in maintaining the proper copper concentration in the reduction circuit as well to provide liquor which is useful in the grinding process itself. Details of the recycle liquor circuit are amplified below.

REDUCTION-LEACH

The reduction-leach portion of the pilot plant is the location where the nodules are chemically reacted to make the metals of interest soluble in a strong ammoniacal ammonium carbonate solution. This is accomplished by reducing and converting the $MnO_2$ in the nodules to $MnCO_3$.

After leaving the rod mill, the nodules are passed through a conduit into a vibrator (not shown). The purpose of the vibrator is to remove any tramp material. The vibrator utilized is a Sweco vibrating screen. The material that enters and leaves the vibrator is actually a liquid slurry. Connected to the vibrator is a surge tank (not shown). The purpose of the surge tank is to serve as a storage unit so that the process plant will not have to be shut down in the even that there is a malfunction in some piece of ore preparation machinery. After leaving the surge tank, a feed pump pumps the slurry to the reduction circuit.

The reduction circuit includes six reactors connected in series. These reactors are 60 gallon capacity reactors which are used to a 42 gallon capacity in the actual processing. Each reactor is formed of 316 stainless steel and is outfitted with agitators, pressure gages, level alarms, and gas sparging equipment.

Gas sparging is directed underneath the agitator from the bottom of the reactor where a reduction gas containing 95 percent carbon monoxide and 5 percent hydrogen is introduced. This mixture is used because it is similar to a reduction gas mixture that is available in commercial quantities. Of course, hydrogen is unnecessary in the process. Indeed, the only gas necessary for the process is carbon monoxide. The off gas coming out of the reactors first goes through condensers which remove some of the water in the gases before going to off gas rotometers which give an indication of the amount of gases coming out of a reactor. The off gases go through an ammonia scrubber and are exited to the atmosphere.

The reactors themselves are outfitted with gravity overflows so that there is a cascading system from the first through the sixth reactor. In one important embodiment of the system, each of the first four reactors is fed an equal amount of feed stock. That is, 25 percent of the slurry being pumped from the ore preparation circuit will go into each of the first four reactors. It has been found advantageous, that there be no nodule injection into at least the last reactor. That is, each portion of nodules should pass through two stages in progression; therefore, there should be no nodule injection in the last stage. It should be noted that in the pilot plant process there is no nodule injection in the last two stages. Each reactor contains a mechanical impeller to achieve mechanical agitation which disperses the gas and suspends the solids. It has been established that the reaction rate of cuprous ion regeneration is influenced by the gas-liquid mass transfer rate of carbon monoxide. The rate is affected primarily by the extent of gas-liquid interfacial area, which is in turn affected by the method used to disperse the gas.

While the nodules are fed to the first four reactors, carbon monoxide is sparged into the bottom of each reactor as required. The slurry in the fifth and sixth reactors is approximately 3.5 percent solids and the average residence time in the system is twenty minutes per stage. The slurry overflowing the last reactor is flocculated to enhance settling before entering a clarifier. The clarifier is used to separate the liquid from the solids.

The reduction-leach circuit also includes a gas metering system. As set forth above, the reducing gas is 95 percent carbon monoxide and 5 percent hydrogen. It has also been found advantageous to include a 1 percent methane tracer in the reducing gas. The methane was used as an aid in establishing material balances. The reducing gas is fed from portable cylinders through a pressure reducing valve and a gas totalizer. The gases are metered individually to each of the six reactors as required to maintain the cuprous ion within various control ranges. The gases are also sampled by gas chromatographs.

START-UP

The process of the present invention is directed toward a continuous process in which nodules are continuously processed to produce various desirable metals. In order to reach a continuous steady state, the reactor vessels must be loaded with start-up materials. Thus, each of the six reactors are filled with an ammonia-ammonium carbonate solution containing approximately 100 grams per liter total ammonia and approximately 15 grams per liter total carbon dioxide. After the reactors are filled with the ammonia-ammonium carbonate solution, copper metal is added and is partially oxidized. The metal is added as a copper powder and is oxidized to convert some of the copper to cuprous ions. Hydroxyl ions are also produced with the cuprous ions. Enough copper metal is added so that 10 grams per liter copper in solution results. The next step in the start-up procedure is to check the cuprous ion concentration. Thus, the mixture in each reactor is analyzed to make sure that the cuprous concentration. Thus, the mixture in each reactor is analyzed to make sure that the cuprous ion concentration is at an acceptable level of about 7 grams per liter. If more cuprous ions are needed, this can be accomplished by passing the reducing gas through the bottom of the reactor. The first three reactors have pH loops which consist of a finger pump which pumps the solution to a housing which contains a pH electrode. The pH is then measured in a readout on a control panel. The pH is a valuable control device and can be used to indicate whether or not the carbon dioxide, ammonia or cuprous ions have gone off the specified limits.

After the reactor vessels have been loaded for start-up as set forth above, the manganese nodules are added to the first four reactors. The total rate of feed to the four reactors is about 30 pounds per hour of nodules. As the nodules are being fed into the reactors, carbon monoxide is sparged through the bottom of the reactors at a total rate of about 70 standard cubic feet per hour. At this point it should be noted that the amount of carbon monoxide that is fed into each stage of the reactor is controlled by the cuprous ion concentration of the contents of any given reactor. This is determined by analyzing the contents of the reactor periodically. During start-up, this is done every half hour and is continued once an hour while the process is in the steady state stage. After leaving the reduction reactors, the slurry is flowed into a clarifier.

Approximately 120 gallons per hour of reduction slurry enters the clarifier. At this point it should be noted that the clarifier (or thickener as it sometimes is called) thickens the slurry by a physical mechanism. In the clarifier liquid is separated from the slurry as the overflow, leaving an underflow containing a higher percentage of solids.

The overflow from the clarifier is clear liquid which constitutes the recycle reduction liquor. However, after leaving the clarifier, the recycle reduction liquor enters a surge tank whereupon it is passed into an ammonia makeup unit. Gaseous ammonia and carbon dioxide are sparged into the ammonia makeup unit in order to keep the ammonia and carbon dioxide content of the liquid at a prescribed level. At steady state, that level is approximately 100 grams per liter ammonia and the $CO_2$ content about approximately 25 grams per liter. After leaving the makeup unit, the liquid is pumped by a metering pump through a heat exchanger into the first reactor and the grinding mill. The heat exchanger removes heat that was generated in process.

LIQUID ION EXCHANGE EXTRACTION

The solids leave the bottom of the clarifier in the form of a slurry with approximately a 45 percent solids content. The copper metal values are present in the slurry as cuprous ions. In order to extract metal values from the slurry, it is advantageous to oxidize the slurry because the organic extractant used, extracts cupric ions more efficiently than cuprous ions. Thus, the slurry leaving the clarifier is oxidized prior to entering the mixer/settler. To accomplish this oxidation, the slurry is delivered to an oxidizing unit and air is blown through the slurry until the cuprous ions are converted to cupric ions.

In order to extract copper and nickel values directly from the leach slurry, the solids content of the slurry must be lowered to less than 20 weight percent, the pH must be lowered to less than 10 preferrably to 9.3, the slurry and extractant must be agitated and the amount of organic extractant used must be sufficient to maintain an organic continuous phase.

In order to maintain the proper percent of solids (less than 20 weight percent) the slurry is diluted prior to entering the mixer. Dilution can be accomplished by adding pregnant liquor, carbon dioxide, ammonia, and water to a holding tank to which slurry is also added. The ammonia and carbon dioxide can be added as ammonium carbonate or ammonium bicarbonate. The composition of a typical aqueous slurry in the mixer prior to extraction is as follows:

Cu — 0.487 w/o; Ni — 0.567 w/o; Co — 0.051 w/o; $NH_3$ — 62 g/l; $CO_2$ — 46 g/l; solids — 20 w/o. As used throughout this specification the symbol "w/o" represents percent by weight.

This is attained by diluting each liter of 41 w/o slurry with 825 ml of recycle liquor and 1425 ml of an aqueous solution of ammonium bicarbonate at 212 grams per liter.

In the mixer/settler, the copper and nickel values are coextracted by an organic extractant and the cobalt and molybdenum are left in the raffinate. The organic extractant is LIX-64N in a kerosene base. LIX-64N is an extractant sold by General Mills Chemicals, Inc.

Figure 2:
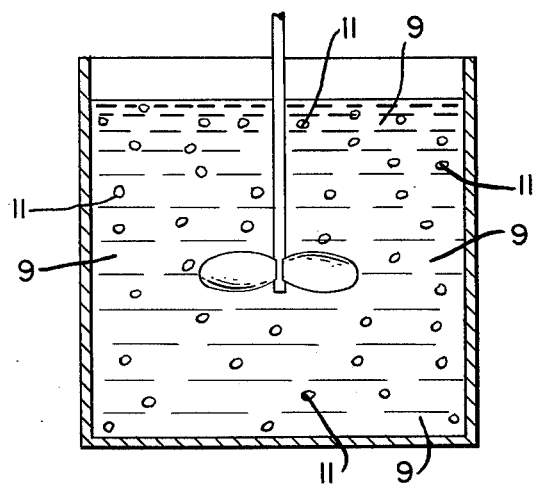
FIG. 2 is a diagram illustrating the "organic continuous mode"

A key factor in the present process is to operate the mixer in the organic-continuous mode. FIG. 2 is a diagram illustrating what is meant by the phrase "organic-continuous mode". Basically an organic-continuous mode is one in which the aqueous occurs as drops in the organic. In other words the organic is the continuous phase and the aqueous is the discontinuous phase. In FIG. 2 the organic phase is represented by referenced numeral 9 and the aqueous is represented by a plurality of drops 11 within organic phase 9.

In order to maintain an organic-continuous mode, the organic to slurry volume ratio is maintained at a critical value dependent on solids content and pH, typically no less than 1 to 1, and preferably at 2 to 1.

Another important factor in the present process is that organic and aqueous (slurry) is agitated. However, the shape and speed of the stirrer should be such that emulsions do not form. Thus, the shape of the propellor should be such as not to impart a high degree of shear to the slurry and organic mixture so that very fine droplets of aqueous phase do not form. The stirrer speed should also be moderate to prevent very fine droplets of the aqueous phase from forming. The presence of these very fine droplets can lead to the formation of an emulsion which does not readily separate in the settler, and hence to large organic losses.

Figure 3:
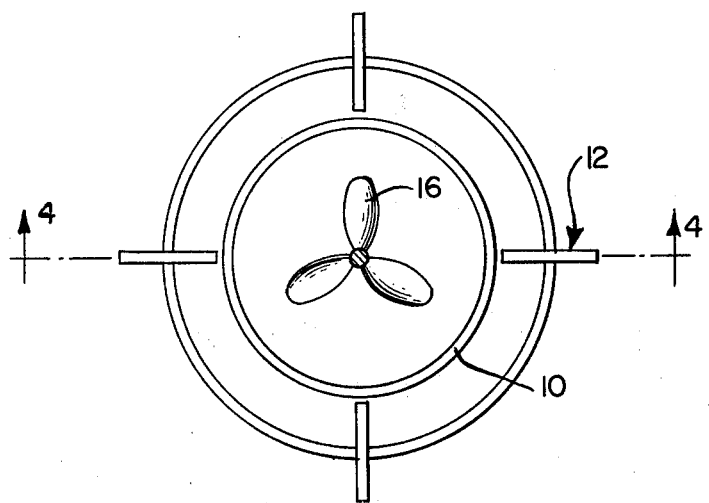
FIG. 3 is a top view of an impeller useful in the process of the present invention.
Figure 4:
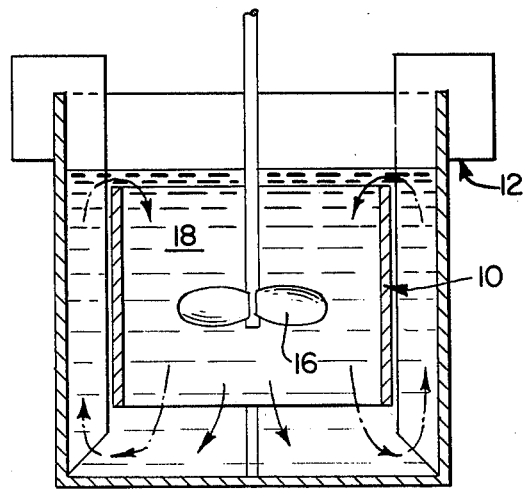
FIG. 4 is a cross-sectional view taken along line 4—4 of FIG. 3.

One mode of mixer operation which is suitable is shown in FIGS. 3 and 4. With this device, a gradient in the ratio of organic to aqueous at different depths is formed within the mixer rather than the uniform concentration that is formed in mixers in conventional liquid-liquid extraction. The device shown in FIGS. 3 and 4 includes inner baffles 10 and side baffles 12 which create a flow path around impellers 16 as is shown by the arrows in FIG. 4. Thus, although the overall organic to aqueous ratio may be unity, this ratio in the active mixing zone 18 is much higher with this mixer due to the flow path that is caused by the baffles.

In the mixer/settler, copper and nickel values are loaded onto the extractant. The raffinate which contains solids and cobalt and molybdenum values is withdrawn for further processing. The cobalt and molybdenum values can be recovered from the raffinate or the raffinate can be discarded.

The copper and nickel values which are loaded on to the extractant are recovered by the process set forth in U.S. Pat. No. 3,853,725 entitled Selective Stripping Process by Roald R. Skarbo, the teachings of which are incorporated herein by reference. That process is described briefly below.

The organic extractant which contains copper and nickel values is washed with an $NH_4$ $HCO_3$ solution followed by an ammonium sulfate solution to remove ammonia picked up during extraction. This scrubbing operation is carried out in another series of mixer settlers. The organic extractant is then stripped with a weak $H_2SO_4$ solution (pH about 3) to preferentially remove nickel. Thereafter, the copper is stripped which is accomplished by using a stronger (160 g/l) $H_2SO_4$ solution. The copper and nickel free organic extractant is recycled back to the mixer/settler.

ELECTROWINNING

Metal recovery is accomplished by electrowinning copper and nickel from the solution prepared in the extraction circuit. This process is performed on a batch basis for the copper recovery and on a continuous basis for the nickel recovery in a separate plant. The metal containing solutions are transferred once a day.

PARAMETERS

As is set forth above, economical extraction of metal values from leached slurries with an organic extractant is made possible by controlling four parameters. Specifically, the percent by weight of solids is maintained at 20% or less; the pH is adjusted to 9.5 or lower (10 or lower in some cases); the extractant and slurry are gently agitated; and, the mixer is operated in an organic-continuous mode.

A preliminary survey of variables affecting the direct extraction of metal values from reduced nodules slurry indicated that pH, solids content and organic to aqueous ratio (O/A) were significant. At the pH of the reduced liquor as it is received from the clarifier (about 11.1) emulsification takes place readily on shaking with LIX-64N in Napoleum. On lowering the pH, however, phase disengagement improves and the rate of phase disengagement increases as the pH is lowered. It is thus desirable to work at as low a pH as possible while maintaining metal values in solution.

The maximum pH tolerable for favorable separation was found to be dependent on the solids content. Working with high solids content imposes more stringent pH control requirements. Broadly, for leached nodule slurries with solids contents of 20 weight percent or less, the pH should be lowered to 10, preferrable to 9.3 or less. If the solids content were lowered to 10% a pH of 10 would be acceptable. Of course, the pH of these slurries is controlled by the $NH_3/CO_2$ ratio. The pH is usually about 11.1 at ambient temperature. However, with leached deep sea nodules slurry, the pH cannot be lowered to less than about 8.5. The reason for this fact is that at pH's lower than about 8.5, the metal values of interest will not remain in solution. With other leached slurries this factor may not be important. Indeed, some leached slurries which can be treated by the present invention have pH's which are lower than 9.3 to begin with.

As is stated above in order to obtain a clean separation of phases with a minimum of organic loss to the slurry it is necessary to operate the mixers in an organic continuous mode. For slurries of 20 wt % solids, a minimum ratio of one volume of organic to each volume of slurry is required to maintain the organic mode of operation. At lower solids content, this value can be reduced and an organic to aqueous ratio of about 0.75 could be tolerated. However, the time for phase separation was found to vary inversely with solids content and the maximum value which could be readily handled without excessive organic losses was about 20 wt % solids. Shake-out experiments at room temperature and at ~ 40°C were unable to establish any significant effect of temperature on phase disengagement.

In summation preliminary experiments set bounds for some of the variables which must be controlled during slurry extraction. Ammonia and $CO_2$ concentration must be sufficient to maintain metals in solution and at the same time keep the pH well below that of reduced nodule liquor. Solids content should be 20 w/o and below, and the mixers should be run in the organic continuous mode.

In accordance with the present invention, diluted slurries were prepared using reduced nodule slurries from pilot plant runs. Underflow, consisting of approximately 45 wt % solids, was diluted with pregnant overflow liquor and $NH_3$—$CO_2$ solutions of suitable concentration to obtain a diluted slurry of the order of 17–20 w/o solids. Actual solids content of the slurries were determined by weighing a known volume.

Figure 5:
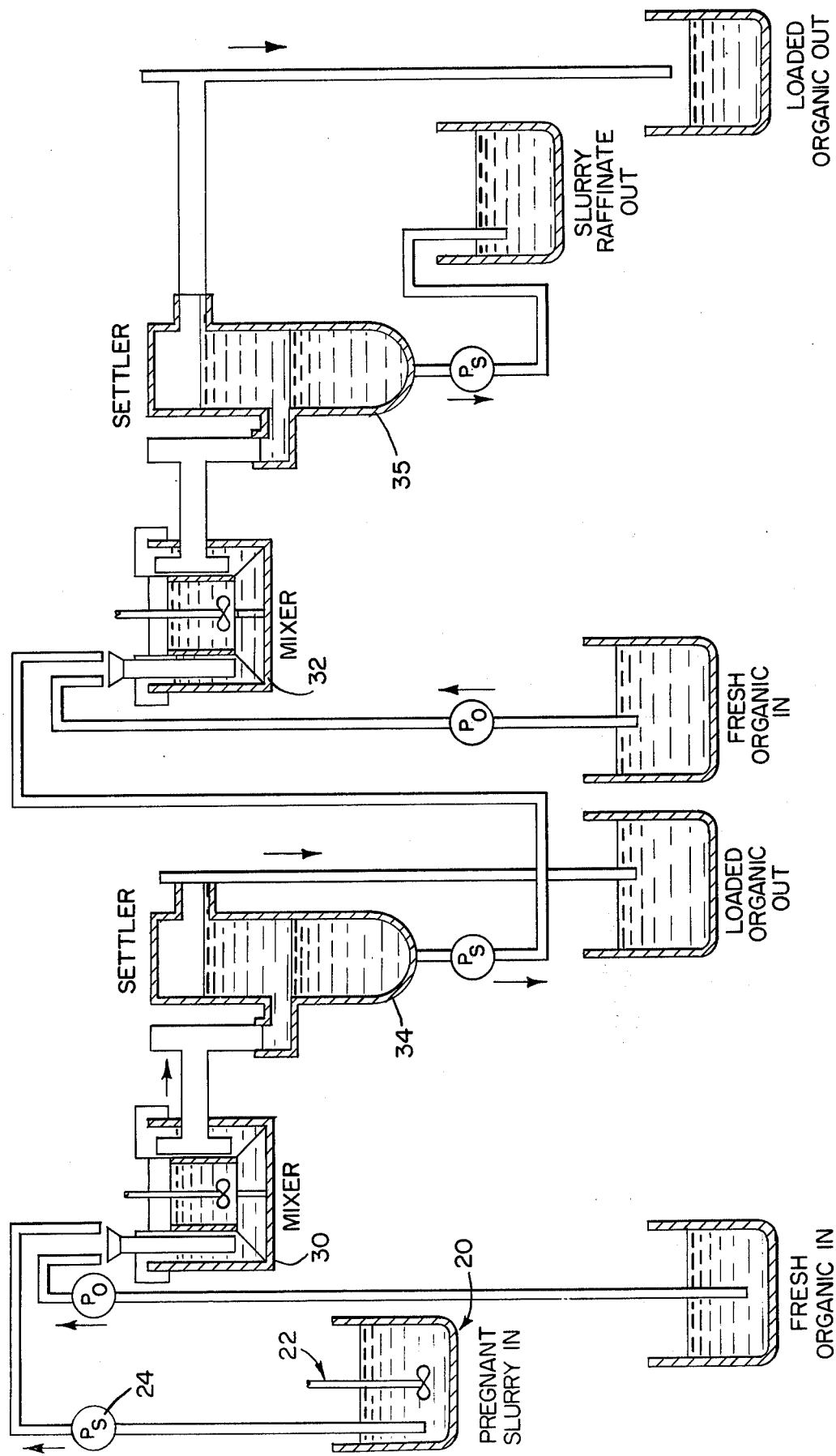
FIG. 5 is a schematic diagram of a two-stage extraction unit.

A schematic diagram of a two-stage extraction apparatus used in connection with these slurries is shown in FIG. 5. Pregnant slurry was continually agitated in the hold tank 20 by mixer 22 and maintained at the desired temperature. Flows into the mixer 30 was controlled by finger pump 24. Flow rates were regulated at about 25 ml per minute, resulting in a retention time of about 4 minutes in the mixers 30, 32 and 8 minutes in the settlers, 34, 35. Fresh organic was introduced into the mixers 30, 32 at each stage so that the total O/A ratio in the system was 2 while the O/A in the mixers 30, 32 was 1. Mixing was accomplished with three-bladed high pitch impellers in the cylindrical baffled mixer as shown in FIGS. 3 and 4. A draft tube was used to facilitate retaining an organic continuous operation in the mixer. It was found that if the O/A ratio in the mixer was 2 or greater, the draft tube could be eliminated. This could be achieved by increasing the organic flow rate, or by using a partial organic recycle to the mixer.

Countercurrent extraction with two or more stages is commonly used in liquid ion exchange separation and this technique can also be used with slurry extraction. Thus, in FIG. 5, partially loaded organic from settler 35 would flow into mixer 30 rather than fresh organic as indicated in the figure.

Mixer speed was adjusted to maintain a gentle uniform mixing of the two phases. Slurry droplet sizes of the order of 1 mm were maintained. If mixing speed was increased beyond a critical value, phase inversion would occur and the mixer would flip over to aqueous continuous. Still higher speeds resulted in emulsification.

It was observed that a clean separation between the aqeuous (slurry) and organic phases with minimum organic losses depended upon the settler configuration. Narrow, deep settlers were used since they facilitated simple transfer of slurries using pumps. More ideally, use of a shallow settler with large surface area and a bottom rake to prevent solids from settling out is more desirable.

The LIX-64N content of extracted slurry raffinate was determined using a known ultraviolet technique. This technique consists of centrifuging the slurry raffinate to separate liquid and solid, extracting Cu-loaded LIX-64N into $CCl_4$ and measuring its absorption at about 358 nanometers.

Chemical analysis was performed on the slurries and on the filtered liquors. Metal values were normalized to manganese content assuming a manganese value of 27 w/o for reduced nodule solids. Values listed as "Extraction" were obtained by considering that the raffinate slurry would go to a clarifier and that the tailings, 45 w/o solids from the underflow, would not be processed further to recover metals. These values are lower than would be expected in a slurry extraction plant operation since nickel values in the filtered solution are high enough to require an additional extraction stage. Values listed as "Ultimate Extraction" consider that the liquid portion of the slurry raffinate has been reduced to negligible copper and nickel values and that only the metal content of the solids is lost. This value is equivalent to the "Solubilization" of metal values and is near to what would be expected in a commercial slurry extraction process.

Results of two-stage slurry extraction are given in Examples 1 through 5 which show that with proper control of pH, solids content, and mixer operation, metal values may be extracted from slurries and losses of organic reagent held to 100–200 parts per million (ppm). These losses are similar to those observed in ammoniacal systems for LIX-64N extraction of clear pregnant liquor.

EXAMPLE 1

| NH$_3$ - 45 g/l | | T = 40°C | Total O/A - 2 | |
|---|---|---|---|---|
| CO$_2$ - 44 g/l | w/o Solids - 17 | | Mixer O/A - 1 | |

| | Cu | Ni | Co | Mn |
|---|---|---|---|---|
| Diluted Underflow | | | | |
| Liquor, g/l | 3.50 | 4.48 | .036 | 9.85 |
| Slurry, w/o | .316 | .466 | .0722 | |
| Raffinate (2 Stages) | | | | |
| Liquor, g/l | .023 | .920 | .042 | |
| Slurry, w/o | .025 | .145 | .075 | |
| Solids (by difference), w/o | .061 | .231 | .185 | (27) |
| Extraction, w/o | 94 | 72 | 15 | |
| Ultimate Extraction, w/o | 94 | 82 | 18 | |
| Loaded LIX, 1st Stage, g/l | 3.52 | 2.99 | .010 | |
| Loaded LIX, 2nd stage, g/l | .12 | 1.16 | .013 | |
| Organic Losses - .140 gal/1000 gal aqueous (140 ppm) | | | | |

The raffinate liquors contain an appreciable quantity of nickel in solution indicating that an additional extraction stage would be desirable. At the NH$_3$—CO$_2$ level used here, an organic loss of about 140 ppm was obtained.

EXAMPLE 2

| NH$_3$ - 84 g/l | | T = 41°C | Total O/A - 2 | |
|---|---|---|---|---|
| CO$_2$ - 38 g/l | w/o Solids - 18 | | Mixer O/A - 1 | |

| | Cu | Ni | Co | Mn |
|---|---|---|---|---|
| Raffinate (2 Stages) | | | | |
| Liquor, g/l | .278 | 5.13 | .041 | |
| Slurry, w/o | .052 | .467 | .0822 | 11.15 |
| Solid (by difference), w/o | .087 | .424 | .194 | (27) |
| Extraction, w/o | 89 | 13 | 12 | |
| Ultimate Extraction, w/o | 92 | 67 | 14 | |
| Organic Losses - .95 gal/1000 gal aqueous (950 ppm) | | | | |

This run used a high NH$_3$ to CO$_2$ ratio and the pH was about 10.7. Nickel extraction was poor and the organic losses were high. This is an agreement with observations made during the preliminary experiments on the effect of pH on phase disengagement.

EXAMPLE 3

| NH$_3$ - 78 | | T = 43°C | Total O/A - 2 | |
|---|---|---|---|---|
| CO$_2$ - 23 | w/o Solids - 17 | | Mixer O/A - 1 | |

| | Cu | Ni | Co | Mn |
|---|---|---|---|---|
| Raffinate (2 Stages) | | | | |
| Liquor, g/l | .058 | 2.22 | .036 | |
| Slurry, w/o | .024 | .290 | .081 | 11.22 |
| Solids (by difference), w/o | .050 | .394 | .190 | (27) |
| Extraction | 95 | 46 | 14 | |
| Ultimate Extraction | 95 | 70 | 16 | |
| Organic Losses - 1.9 gal/1000 gal aqueous (1900 ppm) | | | | |

Here, again, the NH$_3$—CO$_2$ ratio was high and the pH was about 11. Again, nickel extraction was poor and LIX losses very high.

EXAMPLE 4

| NH$_3$ - 79 | | T = 43°C | Total O/A - 2 | |
|---|---|---|---|---|
| CO$_2$ - 64 | w/o Solids - 17 | | Mixer O/A - 1 | |

| | Cu | Ni | Co | Mn |
|---|---|---|---|---|
| Raffinate (2 Stages) | | | | |
| Liquor, g/l | .26 | 3.20 | .131 | |
| Slurry, w/o | .039 | .348 | .070 | 9.88 |
| Solid (by difference), w/o | .063 | .443 | .169 | |
| Extraction, w/o | 92 | 39 | 19 | |
| Ultimate Extraction, w/o | 94 | 68 | 25 | |
| Loaded LIX, 1st Stage, g/l | 3.99 | 1.53 | | |
| Loaded LIX, 2nd Stage, g/l | 1.04 | 1.19 | | |
| Organic Losses - .097 gal/1000 gal (97 ppm) | | | | |

In this experiment the NH$_3$ to CO$_2$ ratio was appreciably lower. The mixer was purposely run at a very low agitation rate to observe the effect on LIX losses, and, indeed, the LIX losses were the lowest observed. However, nickel extraction was extremely poor. With the mixing rate used here, several additional slurry extraction stages would be required.

EXAMPLE 5

| NH₃ - 62 | | T = 26°C | Total O/A - 2.53 | |
| CO₂ - 46 | w/o Solids - 20 | | Mixer O/A - 1.27 | |

|  | Cu | Ni | Co | Mn |
|---|---|---|---|---|
| Underflow |  |  |  |  |
| Liquor, g/l | 9.40 | 11.50 | .016 |  |
| Slurry, g/l | .778 | .898 | .095 | 11.10 |
| Diluted Underflow |  |  |  |  |
| Liquor, g/l | 5.50 | 6.19 | .058 |  |
| Slurry, g/l | .496 | .574 | .039 | 4.30 |
| Raffinate (1-stage) |  |  |  |  |
| Liquor, g/l | .243 | 2.59 | .054 |  |
| Slurry, g/l | .043 | .286 | .063 | 7.65 |
| Solid (by difference), w/o | .092 | .38 | .21 |  |
| Extraction, w/o | 89 | 47 | 4 |  |
| Ultimate Extraction, w/o | 92 | 71 | 7 |  |
| Raffinate (2-stages) |  |  |  |  |
| Liquor, g/l | .031 | .79 | .056 |  |
| Slurry, g/l | .014 | .117 | .038 | 4.53 |
| Solid (by difference), w/o | .065 | .315 | .200 |  |
| Extraction, w/o | 94 | 69 | 8 |  |
| Ultimate Extraction, w/o | 94 | 76 | 12 |  |
| Loaded LIX, 1st Stage, g/l (O/A - 1.30) | 3.97 | 2.44 | .016 |  |
| Loaded LIX, 2nd Stage, g/l (O/A - 1.23) | .21 | 1.34 | .006 |  |
| Organic losses - .180 gal/1000 gal aqueous (180 ppm) |  |  |  |  |

This was an extensively sampled run which enabled us to follow the extraction through the two stages. Copper extraction is near a maximum after the first stage while nickel extraction increases in the second stage. The solids content was on the high side at about 20 wt % and the NH₃ to CO₂ ratio was somewhat higher than optimum, the pH being about 10.0. LIX losses were, however, held to a reasonable level. The process of the present invention can be practiced with numerous organic ion exchange extractants. Indeed, the various extractants that can be employed in practicing the process of the present invention are too numerous to list in this specification. For example, oximes can be employed to great advantage in the process of the present invention.

The oximes which can be used in accordance with the invention include α-hydroxy oximes, substituted hydroxy benzophenoximes, and mixtures thereof.

The α-hydroxy oxime component has the general formula

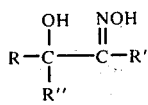

where R, R' and R'' may be any of a variety of organic hydrocarbon radicals such as aliphatic and alkylaryl radicals. R'' may also be hydrogen. Preferably, R and R' are unsaturated hydrocarbon or branched chain alkyl groups, containing from about 6 to 20 carbon atoms, R and R' are also preferably the same and, when alkyl, are preferably attached to the carbons substituted with the —OH and =NOH groups through a secondary carbon atom. It is also preferred that R'' is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9, 27-dien-18-oxime, 5-10-diethyl - 8 -hydroxytetradecane-7-oxime, and 5,8-diethyl-7-hydroxydodecane-6-oxime. The latter compound has the following structural formula:

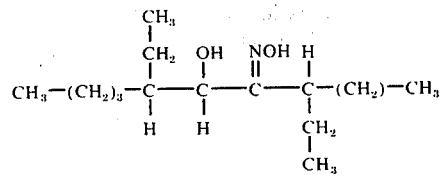

Representative of other mono- and polyunsaturated radicals are heptenyl, octenyl, decenyl, octadecenyl, octadencynyl and alkyl substituted radicals such as ethylocatadecenyl. Representative of other mono- and polyalkyl substituted saturated radicals are ethylhexyl, diethylheptyl, butyldecyl, butylhexadecyl, ethylbutyldodecyl, butylcyclohexyl and the like.

The α-hydroxy oxime component is also characterized as having a solubility of at least 2% by weight in the hydrocarbon solvent used to make up the organic phase and substantially complete insolubility in water.

The substituted benzophenoximes useful in the present invention have the following formula:

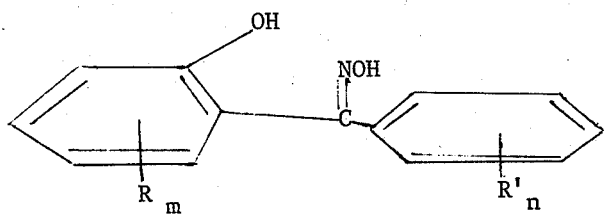

in which R and R' may be individually alike or different and are saturated aliphatic groups, ethylenically unsaturated aliphatic groups or saturated or ethylenically unsaturated aliphatic ether groups (i.e. — OR'') and $m$ and $n$ are 0, 1, 2, 3 or 4 with the proviso made that $m$ and $n$ are not both 0. The total number of carbon atoms in $R_m$ and $R'_n$ is from 3–25. R and R' contain 1 to 25 carbon atoms when saturated aliphatic and 3 to 25 carbon atoms when they are ethylenically unsaturated groups. Preferably, the position ortho to the phenolic-OH substituted carbon atom is unsubstituted and also preferably the positions ortho to the oxime carbon atom on the other aromatic nucleus are unsubstituted. Branched chain saturated aliphatic hydrocarbon substituents are preferred. Compound of the above type include the following:

2-hydroxy-3'methyl-5-ethylbenzophenoxime
2-hydroxy-5-(1,1-dimethylpropyl)-benzophenoxime
2-hydroxy-5-(1,1-dimethylethyl)-benzophenoxime
2-hydroxy-5-octylbenzophenoxime
2-hydroxy-5-nonyl-benzophenoxime
2-hydroxy-5-dodecyl-benzophenoxime
2-hydroxy-2',4'-dimethyl-5-octylbenzophenoxime
2-hydroxy-2',3',5'-trimethyl-5-octylbenzophenoxime
2-hydroxy-3,5-dinonylbenzophenoxime
2-hydroxy-4'-(1,1-dimethylethyl)-5-(2-pentyl)-benzophenoxime
2-hydroxy-4'-(1,1-dimethylethyl)-5-(2-butyl)-benzophenoxime
2-hydroxy-4-dodecylbenzophenoxime
2-hydroxy-4'-(1,1-dimethylethyl)-5-methyl-benzophenoxime
2-hydroxy-4',5-bis-(-1,1-dimethylethyl)benzophenoxime When the α-hydroxy aliphatic oximes are employed in combination with the 2-hydroxy benzophenoximes, the α-hydroxy aliphatic oxime extractants having the following general formula may be used:

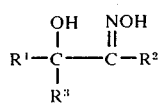

where $R^1$, $R^2$, and $R^3$ may be any of a variety of organic radicals such as aliphatic and alkylarly radicals. $R^3$ may also be hydrogen. Preferably, $R^1$ and $R^2$ are unsaturated hydrocarbon or branched chain alkyl groups containing from about 6 to 20 carbon atoms. $R^1$ and $R^2$ are also preferably the same and when alkyl are preferably attached to the carbons substituted with the —OH and =NOH groups through a secondary carbon atom. It is also preferred that $R^3$ is hydrogen on unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9, 27-dien-18-oxime, 5,10-diethyl-8-hydroxytetradecane-7-oxime, and 5,8-diethyl-7-hydroxydodecane-6-oxime. The latter compound has the following structural formula:

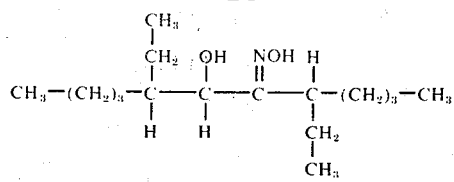

Representative of other mono- and polyunsaturated radicals are heptenyl, octenyl, decenyl, octadecenyl, octadecynl and alkyl substituted radials such as ethyloctadecenyl. Representative of other mono- and polyalkyl substituted saturated radicals are ethylhexyl, diethylheptyl, butyldecyl, butylhexadecyl, ethylbutyldodecyl, butylcyclohexyl and the like. The $R^1$, $R^2$ and $R^3$ groups may contain inert substituents. The amount of the extractants in the organic solvent can vary within considerable limits. In general, however, the concentration of total oxime is in the range 2–25%, based on the weight of the organic extracting solution, preferably in the range of 5–15%.

These and other suitable oximes are disclosed for example by U.S. Pat. Nos. 3,224,873, 3,592,775, 3,455,680, 3,428,449, 3,276,863 and 3,197,274. Particularly suitable extractants comprise: 2-hydroxy-4-nonyl-benzophenoxime which is the primary extractant in a composition also containing an α-hydroxy oxime sold by General Mills Inc. under the tradename LIX-64N; 5,8 diethyl-7-hydroxy-6-dodecanone oxime which is the primary extractant in a composition sold by General Mills Inc. under the tradename LIX-63; and, 2-hydroxy-4-dodecyl-henzophenoxime which is the primary extractant in the composition also containing an α-hydroxy oxime sold by General Mills Inc. under the tradename LIX-64.

From the foregoing it is apparent the slurry extraction in accordance with the present invention has specific applicability in the recovery of metal values such as copper and nickel from deep sea manganese nodules. The process, however, has broad applicability and can be used for example in the slurry extraction of other minerals in ammoniacal solutions.

Indeed improved results occur when slurry extraction is performed under conditions such that there is organic-continuous phase, a pH of 10.0 or lower, a solids percentage in the slurry of 20% or less and the slurry is agitated at a speed which is sufficient to increase contact between the organic and the slurry without causing the formation of an emulsion.

Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for the recovery of base metal values selected from the group consisting of copper and nickel from a manganese containing ore comprising introducing a stream of said manganese containing ore into a reaction vessel containing cuprous ions in an aqueous ammoniacal ammonium carbonate solution to enable the cuprous ions to reduce the manganese oxides in the ore and solubilize the metal values therein, delivering reduced manganese ore slurry from the reaction vessel to a mixer/settler, lowering the pH of the slurry to at least 10.0, but not lower than 8.5, maintaining the amount of solid in the slurry in the mixer at 20% by weight or less, introducing an organic extractant capable of extracting copper and nickel values from aqueous ammonical ammonium carbonate solutions at pH's between 8.5–10 into the mixer/settler, the volume of slurry and organic extractant being maintained at a ratio so that the organic extractant in the mixer is in the continuous phase and extracting the base metal values from the slurry with the extractant, the control of pH, solid content of the slurry and mixer operation enabling metal values to be extracted from slurries with losses of organic reagents held to 100–200 parts per million.

2. The process as set forth in claim 1 wherein an oxime extractant is introduced into the mixer/settler to extract the base metal values from the slurry.

3. The process as set forth in claim 1 wherein the slurry and extractant are mixed in the mixer at speeds sufficiently slow so the formation of emulsions are avoided.

4. The process as set forth in claim 3 wherein an oxime extractant is introduced into the mixer/settler to extract the base metal values from the slurry.

5. The process as set forth in claim 3 including the step of oxidizing the slurry to convert the cuprous ions to cupric ions said oxidation being performed prior to the extracting step.

6. The process as set forth in claim 5 wherein an oxime extractant is introduced into the mixer/settler to extract the base metal values from the slurry.

7. The process as set forth in claim 3 wherein the slurry is maintained at 20% by weight or less by diluting the slurry with ammonia, carbon dioxide and water.

8. The process as set forth in claim 7 wherein an oxime extractant is introduced into the mixer/settler to extract the base metal values from the slurry.

9. The process as set forth in claim 3 wherein the extractant to slurry volume ratio is maintained at 2 to 1 during the mixing step.

10. The process as set forth in claim 9 wherein an oxime extractant is introduced into the mixer/settler to extract the base metal values from the slurry.

11. The process as set forth in claim 3 wherein the pH of the slurry is lowered to 9.3.

12. The process as set forth in claim 11 wherein an oxime extractant is introduced into the mixer/settler to extract the base metal values from the slurry.

13. A process for extracting at least one metal value selected from the group consisting of copper and nickel directly from a slurry which contains solids and an ammoniacal solution containing the metal values to be extracted comprising the following steps:
  a. adjusting the pH of the slurry to a value of 10.0 or lower, but not lower than 8.5;
  b. diluting the slurry so that the solid content of the slurry is at a value of 20% by weight or less;
  c. contacting the slurry with an organic extractant capable of extracting said copper and nickel metal values from said ammoniacal leach solutions having pH's between 8.5 and 10, the volume of organic extractant being selected so that the system is in an organic-continuous phase;
  d. agitating the slurry to increase contact between the organic extractant and the slurry without causing the formation of emulsions; and,
  e. separating the extractant from the slurry to yield an organic extractant loaded with said copper and nickel metal values;

the control of pH, solid content of the slurry and mixer operation enabling metal values to be extracted from slurries with losses of organic reagents held to 100–200 parts per million.

14. The process as set forth in claim 13 wherein in step (c), the slurry is contacted with an organic oxime extractant.

15. The process as set forth in claim 13 wherein in step (c) the extractant to slurry volume ratio is maintained at 2 to 1.

16. The process as set forth in claim 15 wherein in step (c), the slurry is contacted with an organic oxime extractant.

* * * * *